United States Patent
Hoang (10) Patent No.: US 8,654,844 B1
(45) Date of Patent: Feb. 18, 2014

(54) INTRA FRAME BEATING EFFECT REDUCTION

(75) Inventor: Dzung Tien Hoang, Austin, TX (US)

(73) Assignee: Zenverge, Inc., Santa Clara, CA (US)

(*) Notice: Subject to any disclaimer, the term of this patent is extended or adjusted under 35 U.S.C. 154(b) by 1302 days.

(21) Appl. No.: 12/049,238

(22) Filed: Mar. 14, 2008

Related U.S. Application Data (60) Provisional application No. 61/025,992, filed on Feb. 4, 2008.

(51) Int. Cl.
*H04N 7/12* (2006.01)

(52) U.S. Cl.
USPC ............ 375/240.13; 375/240.03; 375/240.12; 375/240.16; 375/240.26

(58) Field of Classification Search
USPC ............. 375/240.13, 240.03, 240.12–240.16, 375/240.26
See application file for complete search history.

(56) References Cited

U.S. PATENT DOCUMENTS

| | | | | |
|---|---|---|---|---|
| 5,249,053 | A * | 9/1993 | Jain ........................... | 348/207.99 |
| 2007/0036213 | A1* | 2/2007 | Matsumura et al. ...... | 375/240.03 |
| 2008/0101465 | A1* | 5/2008 | Chono et al. ............. | 375/240.03 |
| 2010/0278236 | A1* | 11/2010 | Yang et al. ................ | 375/240.13 |

OTHER PUBLICATIONS

Yang, H. et al., "Effective Flicker Removal from Periodic Intra Frames and Accurate Flicker Measurement," ICIP 2008, IEEE, pp. 2868-2871.

* cited by examiner

*Primary Examiner* — Dang Ton
*Assistant Examiner* — Mandish Randhawa
(74) *Attorney, Agent, or Firm* — Fenwick & West LLP (57) ABSTRACT

A system (and a method) are disclosed for reducing intra frame beating effect at frame level and macroblock (MB) level within a video processing system. The frame-level system includes a pre-encoding unit, a reconstruction unit, an intra-beat frame evaluation unit, an intra-beat frame selection unit and an entropy encoding unit. The pre-encoding unit identifies an intra-beat frame of current group of pictures (GOP) and its corresponding intra-beat reference frame, and predicts the intra-beat frame by its intra-beat reference frame. The intra-beat frame evaluation unit calculates an intra-beat frame score. The intra-beat frame selection unit selects an intra-beat frame for re-encoding. The macroblock-level system includes corresponding processing units as frame-level system, but configured to efficiently process MBs. The macroblock-level system allows each MB of an intra-beat frame to be selectively pre-filtered using its intra-beat reference frame.

29 Claims, 7 Drawing Sheets

Open GOP

FIG. 1A: Closed GOP (Prior Art)

FIG. 1B: Closed GOP

FIG. 1C: Open GOP (Prior Art)

FIG. 1D: Open GOP

INTRA FRAME BEATING EFFECT REDUCTION

CROSS-REFERENCE TO RELATED APPLICATIONS

The present application claims priority under 35 U.S.C. §119(e) to U.S. Provisional Patent Application No. 61/025,992, filed on Feb. 4, 2008, entitled "INTRA FRAME BEATING EFFECT REDUCTION" which is incorporated by reference in its entirety.

BACKGROUND

1. Field of Art

The disclosure generally relates to video compression, and more particularly, to effectively reducing intra frame beating effect within a video processing system.

2. Description of the Related Art

Many multimedia applications available today, such as digital versatile disk (DVD), digital television broadcasting, satellite television, Internet video streaming, video conferencing, video security, and digital camcorders, requires high compression ratios due to limited transmission bandwidth or storage capacity. To improve compression efficiency, currently available coding standards, such as MPEG-1, MPEG-2, MPEG-4 and H.264/AVC etc., removes information redundancy spatially within a video frame and temporally between video frames.

To effectively remove information redundancy contained in a video sequence, MPEG standards introduced three frame types for coding: intra frame (I frame), predicted frame (P frame) and bidirectional predicted frame (B frame). I and P frames are sometimes called anchor frames used for motion-compensated prediction in a group of pictures. B frames in conventional coding standards such as MPEG-2 are predicted using anchor frames, and are not used to predict anchor frames. The different types of frames are organized together into a group of pictures (GOP). A GOP is the smallest random access unit in a video sequence. Thus, a video sequence is often stored as a sequence of GOPs in memory.

There are two types GOPs: open and closed. The predicted P and B frames in a closed GOP are not predicted from a frame not in that GOP. In an open GOP, the first B frames in the GOP can be predicted from the last anchor frame in the previous GOP.

Figure 1A:
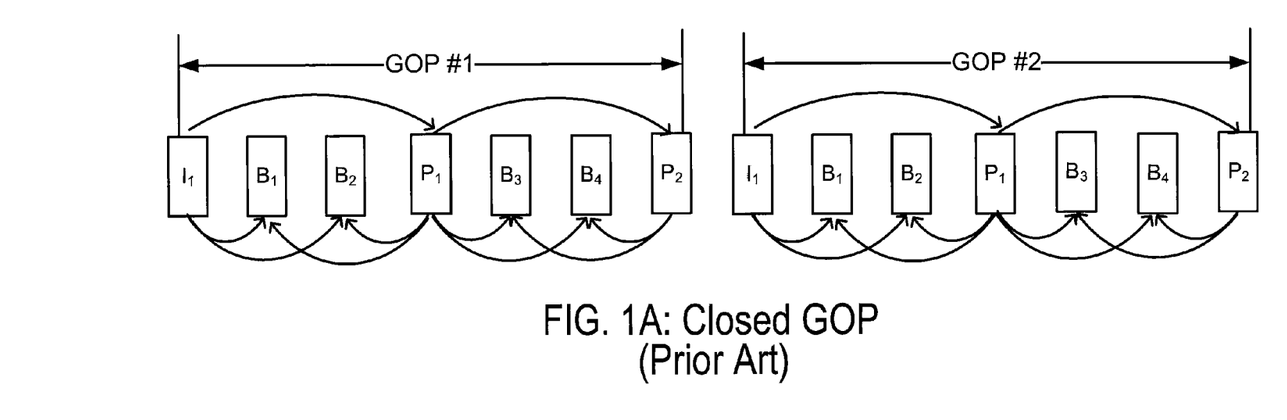
FIG. 1A is a diagram of a conventional coding structure for closed GOPs.

FIG. 1A is a diagram of a conventional encoding pattern and dependencies between I, P, and B frames in a GOP and among two consecutive closed GOPs. A typical closed GOP starts with an I frame. Arrows represent inter-frame prediction dependencies. For example, for the first GOP, i.e. GOP #1, the first P frame, $P_1$, is coded using the past I frame, which is $I_1$, as a reference. Each subsequent P frames use the past P frames as its reference, i.e. $P_2$ is coded using $P_1$ as its reference. B frames are coded using the closest past I and/or P frames as a reference for forward prediction, and the future I or P frames for backward prediction. For example, $B_1$ and $B_2$ are coded using h as their reference for forward prediction, and $P_1$ as their reference for backward prediction. Such encoding pattern and dependencies between I, P, and B frames in GOP #1 is repeated for GOP #2 and subsequent GOPs, and no frame from GOP #1 is used to predict the frames of GOP #2.

Figure 1B:
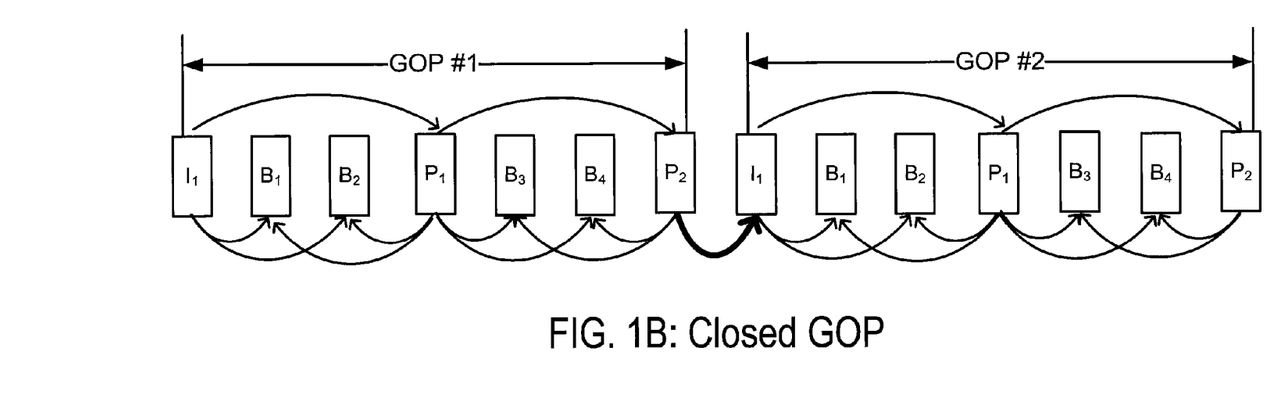
FIG. 1B is a high-level diagram of closed-GOP coding structure with intra frame beating reduction capability according to one embodiment.
Figure 1C:
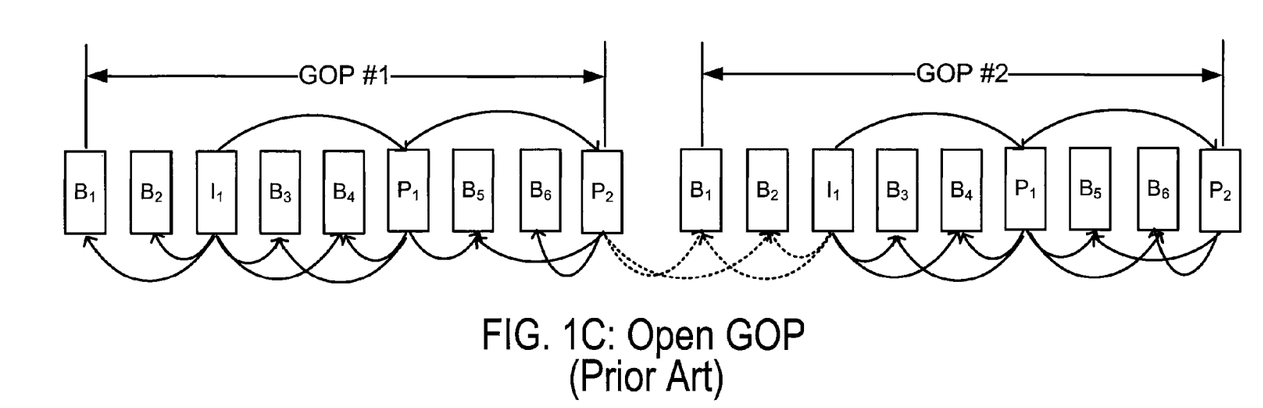
FIG. 1C is a diagram of a conventional coding structure for open GOPs.

FIG. 1C is a diagram of a conventional encoding pattern and dependencies between I, P, and B frames in a GOP and among two consecutive open GOPs. A typical open GOP starts with a B frame. The first two B frames, $B_1$ and $B_2$, in GOP #1 are only predicted from frame $I_1$ because there is no preceeding GOP. Technically, GOP #1 may be considered a closed GOP because it does not have any dependencies to a previous GOP. However, the first two B frames, $B_1$ and $B_2$, in GOP #2 are predicted from $P_2$ in GOP #1 and from $I_1$ in GOP #2 (the dashed arrows). Such encoding pattern and dependencies between I, P, and B frames in GOP #2 is repeated for subsequent open GOPs.

Depending on the compression ratio and characteristics of input video content, various compression artifacts may be introduced from the conventional GOP coding structures described above. Intra frame beating is a compression artifact that often arises when coding an I frame of the current GOP without considering the visual similarity (i.e., temporal redundancy) between the I frame and the last frame (in displaying order) of an immediately previous GOP. For example in FIG. 1A, when coding a video sequence with relatively slow and smooth motion, the last frame in displaying order of GOP #1 is $P_2$, which is coded using $P_1$ as its reference, and $P_1$ is coded using $I_1$ as its reference. Thus, prediction errors in $P_1$ can propagate to $P_2$ because $P_1$ is used as a reference frame to code $P_2$. By construction, an I frame of the subsequent GOP is not coded using any previous GOP frame. Thus, when coding $I_1$ of GOP #2, $P_2$ of GOP #1 is not used as a reference frame for h of GOP #2 no matter how similar h of GOP #2 and $P_2$ of GOP #1 are in content. Due to the different compression algorithms applied to I and P frames and due to the propagation of prediction errors, a very perceivable shift in visual quality can be induced between the last displayed frame in the previous GOP and the I frame in the current GOP. Such an effect is often called intra frame beating.

Such intra frame beating effect may get worse at low bit rates. First, at low bit rates, P frames are quantized more which results in higher prediction error. In turn, the prediction errors accumulate so that the last frame of a GOP contains more coding error than the first frame of the next GOP. An easily observable visual quality jump will usually occur.

In new video coding standards, such as H.264/AVC, intra frame beating effect still poses a significant challenge, sometimes more so than other video coding standards. The main sources of the challenge come from the use of deblocking filter and more differentiated compression algorithms applied to intra frames and non-intra frames.

Hence, there is, inter alia, a lack of a system and method that reduces intra frame beating effect within a video processing system.

SUMMARY

One embodiment of a disclosed system (and method) includes reducing intra frame beating effect within a video processing system. Embodiments of reducing intra frame beating effect include a frame-level system and a macroblock-level system. The frame-level system includes a pre-encoding unit, a reconstruction unit, an intra-beat frame evaluation unit, an intra-beat frame selection unit and an entropy encoding unit. The pre-encoding unit identifies an intra-beat frame of current group of pictures (GOP) and its corresponding intra-beat reference frame, and pre-filters the intra-beat frame by performing motion-compensated prediction, coding, and reconstruction of the intra-beat frame using its intra-beat reference frame. The pre-filtered intra-beat frame, hence, reduces the intra frame beat effect. The intra-beat frame evaluation unit calculates an intra-beat frame score. The intra-beat frame selection unit selects either the original intra-beat frame or the pre-filtered intra-beat frame for encoding. The macroblock-level system includes corresponding processing units as frame-level system, but configured to efficiently process macroblocks (MBs). The macroblock-level system allows each MB of an intra-beat frame to be selectively pre-filtered using the intra-beat reference frame.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Architectural Overview

To efficiently reduce intra frame beating effect according to one embodiment, temporal difference metrics may be used to evaluate the closeness in content (e.g., temporal redundancy) between the two consecutive frames located in two consecutive GOPs. From herein and throughout the entire disclosure, the first I frame of the current GOP, which is not the first GOP of the entire input video sequence, is called intra-beat frame, and the last P frame of the immediate previous GOP is called intra-beat reference frame. For the first GOP of an input video sequence, the first I frame is coded as a normal input I frame without using any reference frame since it is the first frame to be coded for the entire input video sequence.

Figure 1D:
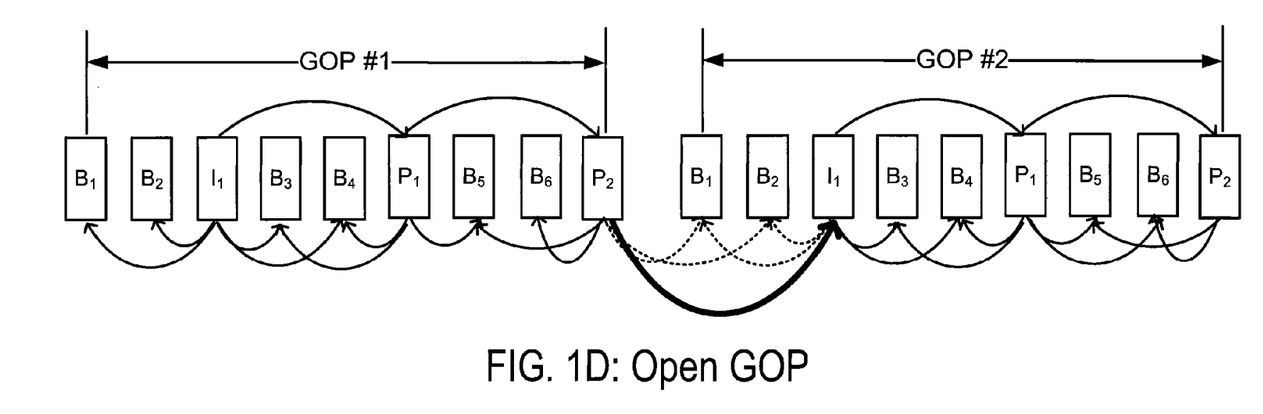
FIG. 1D is a high-level diagram of open-GOP coding structure with intra frame beating reduction capability according to one embodiment.

In one embodiment, the entire intra-beat frame of the current GOP is pre-filtered using motion-compensated predictive coding and reconstruction by its corresponding intra-beat reference frame to reduce intra frame beating effect. FIG. 1B is a high-level diagram of multiple closed-GOPs coding structure with intra frame beating reduction according to one embodiment. FIG. 1D is a high-level diagram of multiple open-GOPs coding structure with intra frame beating reduction according to one embodiment. For example, in FIG. 1B and FIG. 1D, the I frame of GOP #1, $I_1$, is the first frame to be encoded for the entire input video sequence, thus, is not treated as an intra-beat frame. $I_1$ of GOP #2 is an intra-beat frame, and its corresponding intra-beat reference frame is $P_2$ of GOP #1. The arrow from $P_2$ of GOP #1 to $I_1$ of GOP #2 represents the prediction dependency between $P_2$ of GOP #1 to $I_1$ of GOP #2, which is exploited to reduce intra frame beating effect.

For each processing unit of the intra-beat frame, a motion-compensated prediction is formed for the processing unit of the intra-beat frame based on its corresponding intra-beat reference frame. In one embodiment, the processing unit is a macroblock (MB) (16×16 displayed pixels). A prediction residual is generated by subtracting the prediction from the current MB of the intra-beat frame. The prediction residuals of the intra-beat frame are transformed and quantized. The intra-beat frame is reconstructed and stored in a memory buffer. The quantized transform coefficients of the entire intra-beat frame are further evaluated to determine the closeness between the intra-beat reference frame and the intra-beat frame. If the evaluation indicates that the blocks of the two frames are similar, the reconstructed intra-beat frame is encoded again as an intra frame using the standard coding mechanism such as MPEG-2, H.264/AVC, etc, deployed in the embodiments, and sent to a corresponding decoder. On the other hand, if the evaluation indicates that the blocks of the two frames are indeed different, the reconstructed intra-beat frame is removed from the memory buffer, and the original intra-beat frame is encoded using the standard coding mechanism such as MPEG2, H.264/AVC, etc, deployed in the embodiments. Thus, the intra-beat frame is adaptively coded with predictive pre-filtering by the intra-beat reference frame to effectively reduce the intra frame beating effect in the video sequence, or intra coded without prediction by the intra-beat reference frame to preserve the difference in video content. At the same time, the random access capability provided by intra frames is well maintained.

In another embodiment, intra frame beating effect reduction is conducted at macroblock (MB) level. For each MB of the intra-beat frame, it is predicted by performing motion estimation using the best matching MB-sized region selected from the intra-beat reference frame. The best matching MB-sized region is found using block motion estimation. The prediction residuals are transformed and quantized. The quantized transform coefficients of the MB of the intra-beat frame are evaluated to determine the closeness of the MB to the best matching MB-sized region of the intra-beat reference frame. If they are close, the MB of the intra-beat frame is pre-filtered using motion-compensated predictive coding and reconstruction of the intra-beat reference frame. Otherwise, the MB of the intra-beat frame is encoded without pre-filtering. Alternatively, each MB of the intra-beat frame may be predicted by using the collocated MB of the intra-beat reference frame for simplicity. The quantized transform coefficients of the MB of the intra-beat frame are evaluated to determine the closeness of the MB to the collocated MB of the intra-beat reference frame.

One difference between frame-level and MB-level intra frame beating reduction mechanisms described above is that for frame-level intra frame beating reduction, the entire intra-beat frame is either pre-filtered using the intra-beat reference frame or not based upon a computed similarity measure. On the other hand, MB-level intra frame beating reduction allows an encoding system to select certain MBs to be predictively pre-filtered according to an evaluation process. Such flexibility is potentially advantageous for reducing computational complexity and computational power consumption.

Figure 2A:
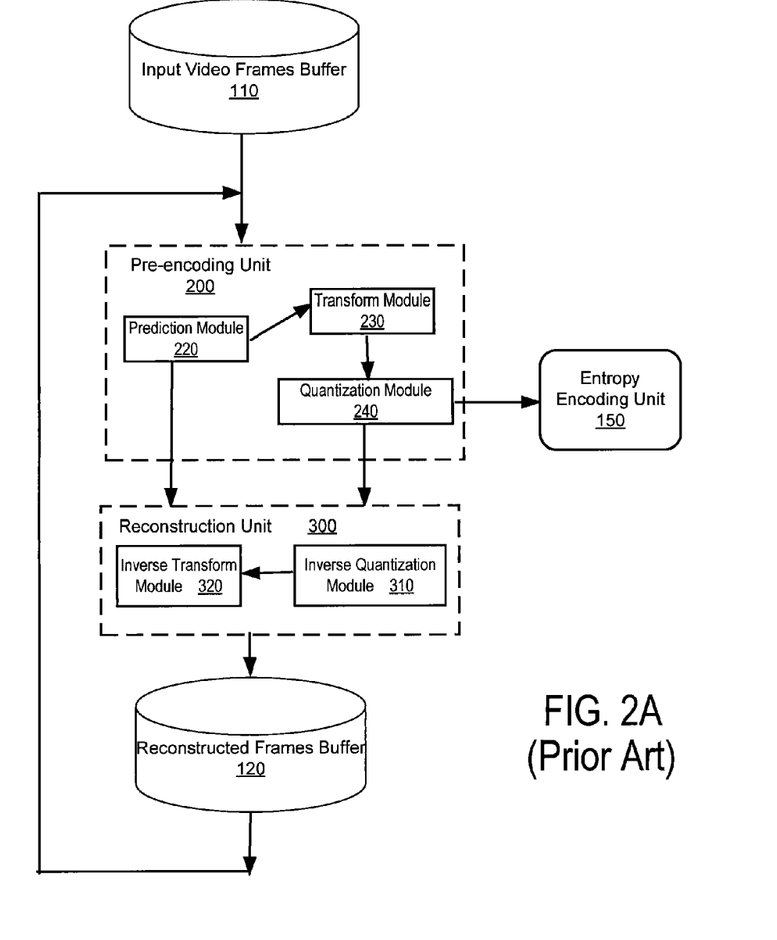
FIG. 2A is a block diagram illustrating a conventional encoding system.
Figure 2B:
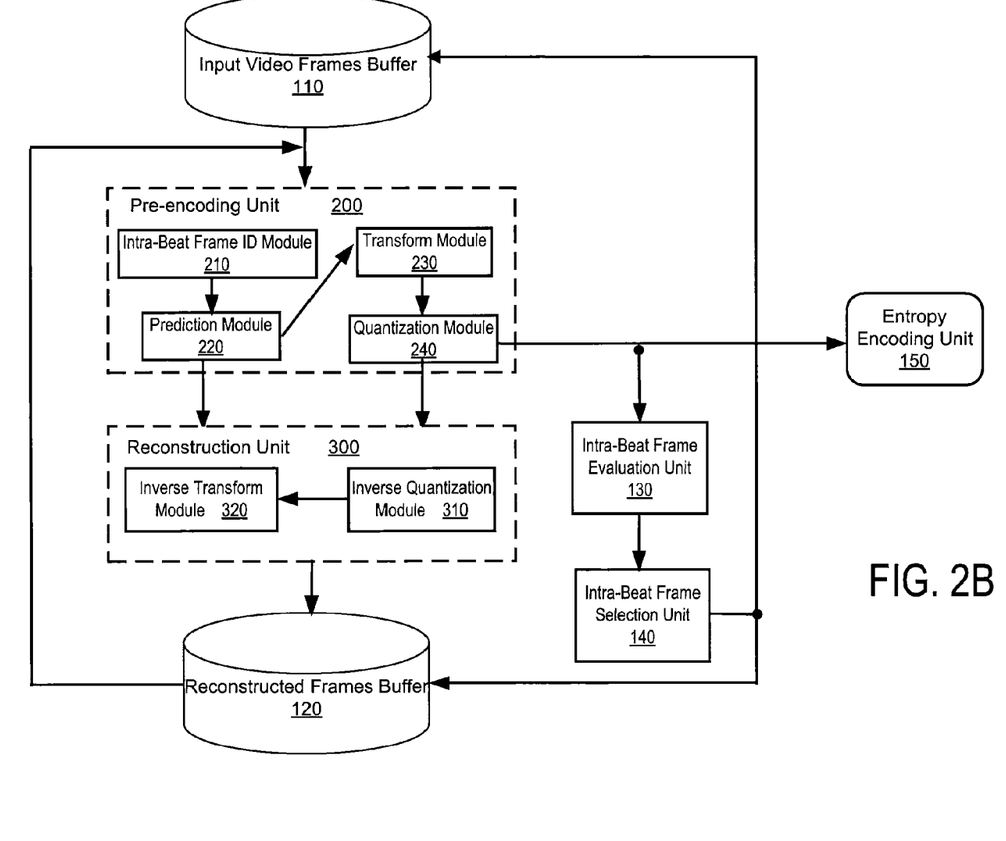
FIG. 2B is a block diagram of an encoding system having frame-level intra frame beating reduction according to one embodiment.

FIG. 2A is a block diagram illustrating modules of a conventional encoding system without intra frame beating reduction mechanism. FIG. 2A is used herein to provide a context for an effective illustration of the intra frame beating reduction at frame level and macroblock level, represented by FIG. 2B and FIG. 2C, respectively. FIG. 3A and FIG. 3B are flow diagrams illustrating methods for reducing intra frame beating effect at frame level and macroblock level, respectively.

Frame-Level Intra Frame Beating Reduction

Referring to FIG. 2A, a conventional encoding system comprises an input video frames buffer 110, a pre-encoding unit 200, a reconstruction unit 300, a reconstructed frames buffer 120, and an entropy encoding unit 150. A conventional encoding system often includes two processing routes: encoding route and reconstruction route. In the encoding route, a conventional encoding system processes an input frame stored in the input video frame buffer 110 in units of a MB. It forms a prediction of the MB by prediction module 220 based on previously coded data, either from the current frame (i.e., intra prediction) or from other frames that have already been coded (i.e., inter prediction). The prediction module 220 subtracts the prediction from the current MB to form a residual. A block of residuals is transformed by transform module 230, and quantized by quantization module 240. The quantized transform coefficients generated by the transform module 230 and the quantization module 240 are sent to the entropy encoding unit 150 to form compressed bitstream.

In the reconstruction route, the quantized transform coefficients are also sent to the reconstruction unit 300. The reconstruction unit 300 comprises an inverse quantization module 310 and an inverse transform module 320. The inverse quantization module 310 rescales the quantized transform coefficients. The inverse transform module 320 recreates the residual data, which are called decoded residual data. The reconstruction unit 300 adds the prediction from the prediction module 220 to the decoded residual data to reconstruct a decoded MB. The above process repeats for each MB of the current frame until a reconstructed frame is obtained. The reconstructed frame is stored in the reconstructed frames buffer 120, and used as a reference frame for the subsequent prediction by the prediction module 220 if the input frame is an I or P frame.

In conventional video coding standards, reconstructed frames are used as references for prediction to efficiently control prediction error propagation. It should be noticed that in a conventional encoding system described in FIG. 2A, an intra frame is not inter predicted by either P or B frames. In addition, a B frame is not reconstructed and stored in the reconstructed frames buffer 120 for predicting I frames or P frames. Consequently, intra frame beating effect may happen when encoding intra-beat frames without considering the temporal redundancy between the intra-beat frames and their corresponding intra-beat reference frames.

To efficiently reduce intra frame beating effect, intra-beat frames need to be encoded with similar visual quality to its corresponding intra-beat reference frames in their immediately previous GOPs if there exists strong temporal redundancy between the two frames. FIG. 2B is a block diagram of an encoding system having frame-level intra frame beating reduction according to one embodiment. The encoding system comprises an input video frames buffer 110, a pre-encoding unit 200, a reconstruction unit 300, a reconstructed frames buffer 120, an intra-beat frame evaluation module 130, an intra-beat frame selection unit 140, and an entropy encoding unit 150.

Turning now to FIG. 2B, it illustrates an encoding system having frame-level intra frame beating reduction according to one embodiment. The system includes an input video frames buffer 110, a reconstructed frames buffer 120, an inter-beat frame evaluation unit 130, an intra-beat frame selection unit 140, an entropy encoding unit 150, a pre-encoding unit 200, and a reconstruction unit 300. The pre-encoding unit 200 receives a video frame from the input video frames buffer 110 and pre-encodes the frame and sends to the reconstruction unit 300 to reconstruct the pre-encoded frame. The pre-encoded frame by the pre-encoding unit 200 is also evaluated by intra-beat frame evaluation unit 130, and its corresponding intra-beat frame is selected by the intra-beat frame selection unit 140. The reconstructed frame is stored in the reconstructed frames buffer 120. The entropy encoding unit 150 conducts entropy encoding on the frame processed by the above processing units and sends the compressed frame data to a storage device or to decoder over a network.

As alluded to above, the encoding system of FIG. 2B comprises two encoding paths. The first encoding path comprises the same modules and follows the same encoding route described in FIG. 2A. For simplicity of explanation, the first encoding path is referred to as conventional encoding path from herein and through the entire disclosure. The second encoding path comprises additional modules for intra-beat frame score generation and intra-beat frame selection. For simplicity of explanation, the second encoding path is referred to as intra-beat encoding path from herein and through the entire disclosure. The additional modules of the intra-beat encoding path are an intra-beat identification module 210, an intra-beat frame evaluation module 130 and an intra-beat frame selection unit 140. An intra-beat frame selected by the intra-beat selection unit 140 that needs prediction by its corresponding intra-beat reference frame is encoded twice by traversing the two encoding paths to reduce intra frame beating effect.

For each GOP being processed by the encoding system in FIG. 2B, the intra-beat encoding path is traversed first. More specifically, the intra-beat frame identification module 210 first identifies intra-beat reference frame, intra-beat frame and normal input frame, which is neither an intra-beat reference frame nor an intra-beat frame, of the current GOP. For an intra-beat frame being processed, the intra-beat frame is inter-predicted by the prediction module 220 using its corresponding intra-beat reference frame. The prediction residuals are transformed by the transform module 230 and quantized by the quantization module 240. The quantized transform coefficients are inversed quantized by the inverse quantization module 310 and inverse transformed with the prediction added by the inverse transform module 320 to reconstruct the intra-beat frame. The reconstructed intra-beat frame is stored in the reconstructed frames buffer 120. The quantized transform coefficients are also sent to the evaluation module 130 to generate an intra-beat frame score of the intra-beat frame. Based on the intra-beat frame score, the intra-beat frame selection unit 140 selects an intra-beat frame to be intra re-encoded. The selected intra-beat frame traverses the conventional encoding path for the re-encoding. For an intra-beat reference frame or a normal input frame, it only traverses the conventional encoding path once.

For each MB being processed, the output of the transform module 230 is a block of transform coefficients. The transform coefficients are further quantized by the quantization module 240. More specifically, the quantization module 240 divides each transform coefficient by an integer value. Such quantization reduces the precision of the transform coefficients according to a quantization parameter (QP). Typically, the result of quantization by the quantization module 240 is a block in which most or all of the coefficients are zero, with a few or no non-zero coefficients. Setting QP to a high value means that more coefficients are set to zero, resulting in high compression at the expense of lesser reconstructed image quality. Setting QP to a low value means that more non-zero coefficients remain after quantization by the quantization module 240, resulting in higher reconstructed image quality but lower compression ratio.

To evaluate the closeness between the intra-beat reference frame and the intra-beat frame, in one embodiment, for each MB of the intra-beat frame being processed, the quantization module 240 uses the same QP used in the corresponding collocated MB in the intra-beat reference frame to quantize the transform coefficients. The intra-beat frame evaluation module 130 receives the quantized transform coefficients of the MB, and records the number of zero-valued quantized transform coefficients of the MB. Such process repeats on each subsequent MB of the intra-beat frame. A total number of zero-valued quantized transform coefficients of the intra-beat frame is calculated. A higher number of zero-valued quantized transform coefficients indicates that the intra-beat frame is more similar to the intra-beat reference frame. In one embodiment, the total number of zero-valued quantized transform coefficients of the intra-beat frame is compared against a configurable threshold value. The configurable threshold value, in one embodiment, is a function of the average QP value of the intra-beat reference frame. In another embodiment, an adaptive method to determine the threshold is to record the number of zero-valued coefficients among recent past P frames, where the threshold data is the number of zero-valued coefficients. The average or median of the historical threshold data is calculated and multiplied by a constant less than 1, e.g., 0.75, and the result of the computation is the new threshold value to be used. This method is independent of QP, assuming that average QP does not change much in the recent past. The intra-beat frame evaluation module 130 sets an intra-beat frame score to be positive if the total number of zero-valued quantized transform coefficients of the intra-beat frame exceeds the configurable threshold value; otherwise, the intra-beat frame evaluation module 130 sets the intra-beat frame score to be negative.

Based on the intra-beat frame score, the intra-beat frame selection unit 140 selects an intra frame to be re-encoded. Responsive to the intra-beat frame score being positive, the intra-beat frame selection unit 140 selects the reconstructed intra-beat frame stored in the reconstructed frame buffer 120 to traverse the conventional encoding path for re-encoding. On the other hand, responsive to the intra-beat frame score being negative, the original intra-beat frame stored in the input video frames buffer is selected to traverse the conventional coding path for re-encoding.

Macroblock (Mb) Level Intra Frame Beating Reduction

Figure 2C:
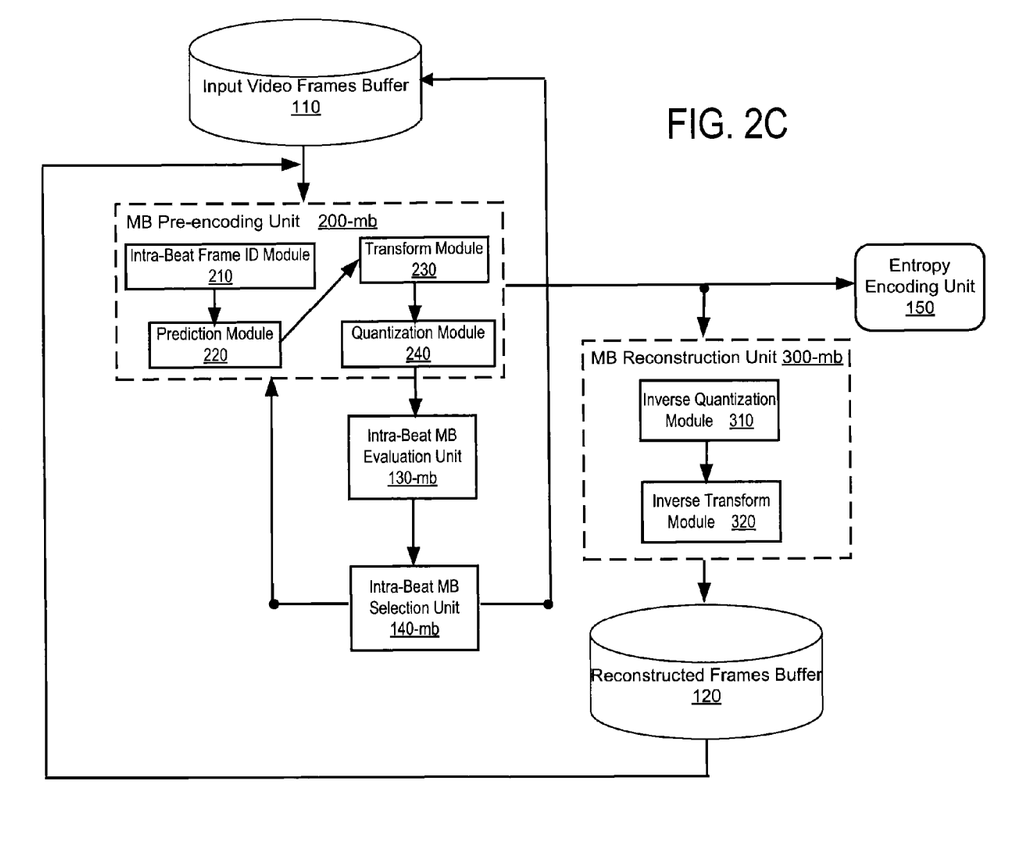
FIG. 2C is a block diagram of an encoding system having macroblock-level intra frame beating reduction according to one embodiment.
Figure 3A:
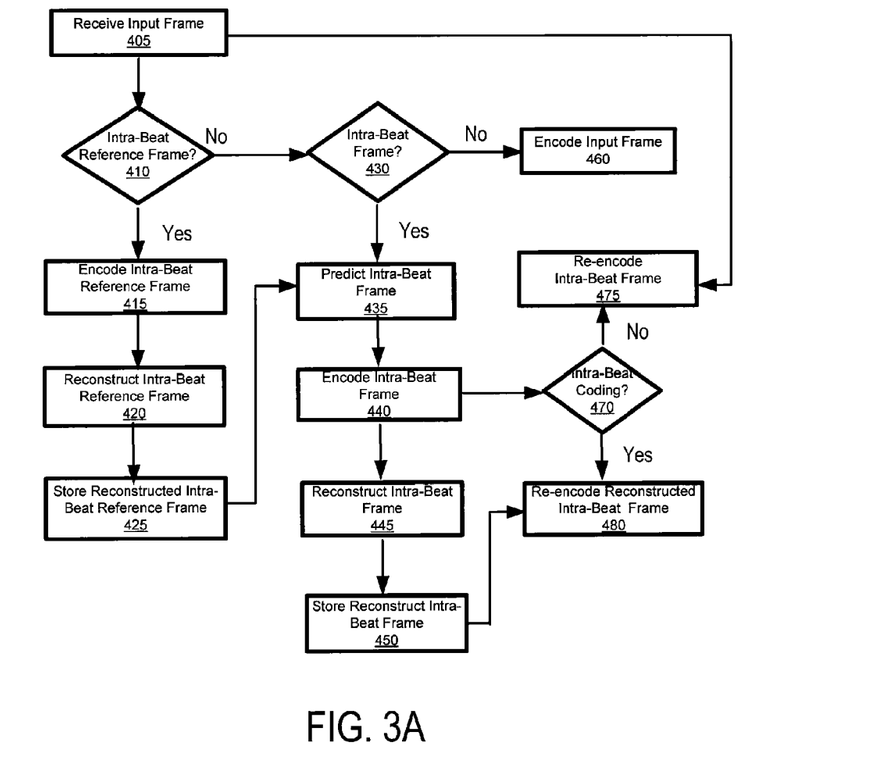
FIG. 3A is a flowchart showing a method of frame-level intra frame beating reduction according to one embodiment.
Figure 3B:
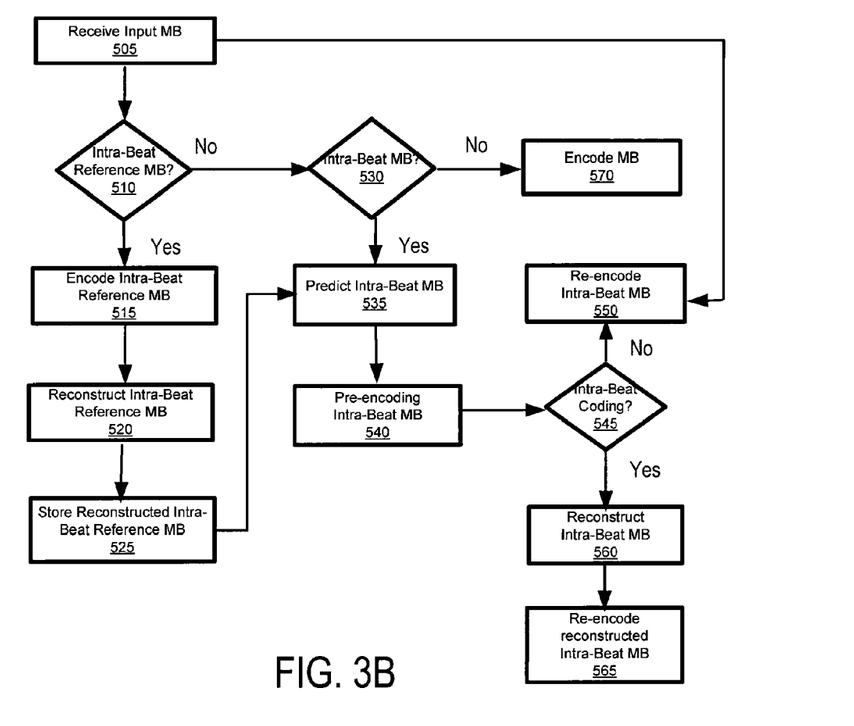
FIG. 3B is a flowchart showing a method of macroblock-level intra frame beating reduction according to one embodiment.

FIG. 2C is a block diagram of an encoding system having macroblock-level intra frame beating reduction according to one embodiment. The encoding system comprises a MB pre-encoding unit 200-*mb*, a MB reconstruction unit 300-*mb*, an intra-beat MB evaluation module 130-*mb*, an intra-beat MB selection unit 140-*mb*, and an entropy encoding unit 150. Comparing with FIG. 2B for frame-level intra frame beating reduction, the intra-beat MB evaluation module 130-*mb* and intra-beat MB selection unit 140-*mb* allow each individual MB of an intra-beat frame to be either predictively pre-filtered or not. Since this decision is made at the macroblock level, the predictively pre-filtered MB can be stored in a small local buffer and re-encoded without first being written to and then read from the input video frame buffer. Thus, for memory efficiency in this case, the reconstructed frame buffer 120 functions as the local buffer for the predictively pre-filtered MB. Consequently, macroblock-level intra frame beating reduction reduces memory bandwidth and computational power consumption, which benefit video processing at low-bit rates.

In one embodiment, an input frame stored in the input video frames buffer 110 is processed by the intra-beat frame identification module 210. An MB of an intra-beat frame is referred to as an intra-beat MB, and an MB of an intra-beat reference frame is referred to as an intra-beat reference MB. An MB of a normal input frame is referred to as a normal MB. A normal MB is encoded once using the conventional encoding path described above For each intra-beat MB being processed, it is predicted using a MB-sized region in the intra-beat reference frame selected by the prediction module 220. The prediction residuals are transformed by the transform module 230 and quantized by the quantization module 240 using the same QP of its corresponding intra-beat reference MB. The quantized transform coefficients are evaluated by the intra-beat MB evaluation module 130-*mb*. In one embodiment, a total number of zero-valued quantized transform coefficients of the intra-beat MB is counted and compared against a configurable threshold value. The configurable threshold value may be configured using either a fixed value or an adaptive method described above. For simplicity, a fixed threshold value may be favored for macroblock-level implementation in one embodiment. The intra-beat MB evaluation module 130-*mb* sets an intra-beat MB score to be positive if the total number of zero-valued quantized transform coefficients of the intra-beat MB exceeds the configurable threshold value; otherwise, the intra-beat MB evaluation module 130 sets the intra-beat MB score to be negative.

Based on the intra-beat MB score, the intra-beat MB selection unit 140-*mb* selects an intra MB to be re-encoded. Responsive to the intra-beat MB score being positive, the intra-beat MB selection unit 140-*mb* instructs the MB pre-encoding unit 200-*mb* to send the quantized transform coefficients and the motion-compensated prediction to the MB reconstruction unit 300-*mb*. The MB reconstruction unit 300-*mb* reconstructs the pre-filtered intra-beat MB and sends this MB to traverse the conventional coding path for re-encoding. On the other hand, responsive to the intra-beat MB score being negative, the intra-beat MB evaluation selection unit 140-*mb* selects the original intra-beat MB stored in the input video frames buffer to traverse the conventional coding path for re-encoding. Such encoding process is repeated on each intra-beat MB of the intra-beat frame.

Intra Frame Beating Reduction Processing

FIG. 3A is a flowchart showing a method of frame-level intra frame beating reduction according to one embodiment. Initially, the pre-encoding unit 200 receives 405 an input frame of current GOP stored in the input video frames buffer. The intra-beat frame ID module 210 identifies 410 the type of the input frame. If it is an intra-beat reference frame, the pre-encoding unit 200 encodes 415 the intra-beat reference frame by the prediction module 220, the transform module 230 and the quantization module 240. The quantized transform coefficients are sent to the entropy encoding unit 150 for further processing. The reconstruction unit 300 reconstructs 420 the intra-beat reference frame by the inverse quantization module 310 and the inverse transform module 320. The encoding system stores 425 the reconstructed intra-beat reference frame in the reconstructed frames buffer 120.

If the input frame is an intra-beat frame 430, the prediction module 220 predicts 435 the intra-beat frame using the reconstructed intra-beat reference frame. The pre-encoding unit 200 encodes 440 the intra-beat frame by the transform module 230 and the quantization module 240. The quantized transform coefficients are sent to the intra-beat frame evaluation module 130 for further processing. The reconstruction unit 300 reconstructs 445 the intra-beat reference frame by the inverse quantization module 310 and the inverse transform module 320. The encoding system stores 450 the reconstructed intra-beat frame in the reconstructed frames buffer 120. The intra-beat frame evaluation module 130 evaluates 470 the quantized transform coefficients of the intra-beat frame and selects an intra-beat frame by the intra-beat frame selection unit 140 to be re-encoded. If an intra-beat frame needs to be predictively pre-filtered, the intra-beat frame selection unit 140 selects the reconstructed intra-beat frame to be re-encoded 480. Otherwise, the intra-beat frame selection unit 140 selects the original intra-beat frame stored in the input frame buffer 110 to be re-encoded 475. If the input frame is a normal input frame, the encoding system encodes 460 the input frame using the conventional encoding route.

FIG. 3B is a flowchart showing a method of macroblock-level intra frame beating reduction according to one embodiment. Initially, the MB pre-encoding unit 200-*mb* receives 505 an input MB of an input frame of current GOP stored in the input video frames buffer. The intra-beat frame ID module 210 identifies 510 the type of the input MB. If it is an intra-beat reference MB, the pre-encoding unit 200 encodes 515 the intra-beat reference MB by the prediction module 220, the transform module 230 and the quantization module 240. The quantized transform coefficients are sent to the entropy encoding unit 150 for further processing. The MB reconstruction unit 300-*mb* reconstructs 520 the intra-beat reference MB by the inverse quantization module 310 and the inverse transform module 320. The encoding system stores 525 the reconstructed intra-beat reference MB in the reconstructed frames buffer 120.

If the input MB is an intra-beat MB 530, the prediction module 220 predicts 535 the intra-beat MB using an MB-sized region selected from the reconstructed intra-beat reference frame by a motion estimation process. The pre-encoding unit 200 pre-encodes 540 the intra-beat MB by the transform module 230 and the quantization module 240. The intra-beat MB evaluation module 130 evaluates 545 the quantized transform coefficients of the intra-beat MB and selects an intra-beat MB by the intra-beat MB selection unit 140 to be re-encoded. If an intra-beat MB needs to be predictively pre-filtered, the encoding system reconstructs 560 the intra-beat MB by the reconstruction unit 300 and re-encodes 560 the reconstructed intra-beat MB using the conventional encoding route. Otherwise, the intra-beat frame selection module 140 selects the original intra-beat MB stored in the input frame buffer 110 to be re-encoded 550. If the input MB is a normal input MB, the encoding system encodes 570 the input MB using the conventional encoding route.

It is noted that FIGS. 3A and 3B are flowcharts showing the methods of frame-level and macroblock-level intra frame beating reduction, respectively, according to one example embodiment. Other embodiments perform different and/or additional steps than the ones described here. Moreover, other embodiments perform the steps in different orders. For example, in one embodiment, a rate controller may also be included to provide available bits to be allocated for a MB currently being processed. In response to enough available bits to intra code the MB, the current MB, even identified to be predictively pre-filtered, may be intra coded for higher image quality.

The disclosed embodiments beneficially allow for a system and methods that efficiently reduce intra frame beating effect at frame level and macroblock level. Allowing intra-beat frames to be adaptively pre-filtered at the macroblock level reduces the bandwidth requirement for processing the intra-beat frames. At the same time, the random access capability provided by intra frames is well maintained. The embodiments identify intra-beat frames and intra-beat reference frames of GOPs of an input video sequence. At the frame level, in first encoding pass the reduction process predictively encodes an intra-beat frame to determine whether the intra-beat frame is to be encoded with or without predictive pre-filtering. In second encoding pass, the intra-beat frame is either coded with predictive pre-filtering by its corresponding intra-beat reference frame to effectively reduce the intra frame beating effect in the video sequence, or intra coded without prediction by the intra-beat reference frame to preserve the difference in video content.

Comparing with frame-level intra frame beating reduction with two encoding passes, the macroblock-level intra frame beating reduction selects certain MBs of an intra-beat frame to be predictively pre-filtered and other MBs to be normally intra coded within a single encoding pass. Consequently, macroblock-level intra frame beating reduction reduces bandwidth and computational power consumption, which benefit video processing at low-bit rates.

Some portions of above description describe the embodiments in terms of algorithmic descriptions and processes. These operations (e.g., the processes described above), while described functionally, computationally, or logically, are understood to be implemented by computer programs or equivalent electrical circuits, microcode, or the like. The computer programs are typically embedded as instructions that can be stored on a tangible computer readable storage medium (e.g., flash drive disk, or memory) and are executable by a processor. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for adaptively selecting quantization parameter for each image region to be coded so that the perceptual quality of the reconstructed video images is efficiently improved through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method for reducing intra frame beating effect at frame level within a video processing system, comprising:
   storing a sequence of groups of pictures in an input video frame buffer;
   encoding intra-beat frame of current group of pictures being processing through two encoding passes, the intra-beat frame of the current group of pictures being a first intra frame of the current group of pictures and the current group of pictures separate from a first group of pictures of the sequence of groups of pictures;
   wherein the first encoding pass comprising:
      pre-encoding the intra-beat frame of current group of pictures using an intra-beat reference frame associated with the intra-beat frame, the intra-beat reference frame being a reference frame of an immediate previous group of pictures, and the reference frame being closest to the intra beat frame in a display order of the groups of pictures;
      calculating an intra-beat frame score of the pre-encoded intra-beat frame by comparing a total number of non-zero valued quantized residual coefficients of the intra-beat frame with a configurable threshold value, the intra-beat frame score representing closeness in content between the pre-encoded intra-beat frame and the intra-beat reference frame;
      responsive to the intra-beat frame score indicating that the pre-encoded intra-beat frame and the intra-beat reference frame are similar, selecting the intra-beat frame to be re-encoded using the intra-beat reference frame in the second encoding pass;
      responsive to the intra-beat frame score indicating that the pre-encoded intra-beat frame and the intra-beat reference frame are different, selecting the intra-beat frame to be re-encoded without using the intra-beat reference frame in the second encoding pass; and
   wherein the second encoding pass comprising:
      re-encoding the intra-beat frame selected by the first encoding pass.

2. The method of claim 1, wherein pre-encoding the intra-beat frame using an intra-beat reference frame comprises:
   predicting the intra-beat frame using the intra-beat reference frame;
   transforming prediction residuals of the intra-beat frame;
   quantizing transform coefficients of the intra-beat frame; and
   reconstructing the intra-beat frame and storing reconstructed intra-beat frame in the reconstructed frames buffer.

3. The method of claim 1, wherein selecting the intra-beat frame to be re-encoder comprises:
   selecting a reconstructed intra-beat frame responsive to a total number of non-zero valued quantized residual coefficients exceeding a configurable threshold value; and
   selecting the intra-beat frame stored in the input frames buffer responsive to the total number of non-zero valued quantized residual coefficients not exceeding the configurable threshold value.

4. The method of claim 1, wherein re-encoding the selected intra-beat frame comprises:
   intra predicting the selected intra-beat frame;
   transforming prediction residuals of the selected intra-beat frame;
   quantizing transform coefficients of the selected intra-beat frame;
   entropy encoding the quantized transform coefficients; and
   reconstructing the selected intra-beat frame, and storing the reconstructed selected intra-beat frame in the reconstructed frames buffer.

5. The method of claim 1, wherein an intra-beat frame of the current group of pictures being processed is an intra frame of the current group of pictures, which is not the first group of pictures of the sequence of groups of pictures.

6. The method of claim 1, wherein an intra-beat reference frame associated with an intra-beat frame is a reconstructed last displayed predictive frame of the immediately previous group of pictures.

7. A computer implemented method for reducing intra frame beating effect at macroblock (MB) level in a video processing system, comprising:
   storing a sequence of groups of pictures in an input video frame buffer;
   pre-encoding each intra-beat macroblock of an intra-beat frame of current group of pictures using an associated intra beat reference macroblock of an intra-beat reference frame, the intra-beat frame of the current group of pictures being a first intra frame of the current group of pictures and the current group of pictures separate from a first group of pictures of the sequence of groups of pictures, and the intra-beat reference frame being a reference frame of an immediate previous group of pictures, and the reference frame being closest to the intra beat frame in a display order of the groups of pictures;

calculating an intra-beat macroblock score of the pre-encoded intra-beat macroblock by comparing a total number of non-zero valued quantized residual coefficients of the intra-beat macroblock with a configurable threshold value, the intra-beat macroblock score representing closeness in content between the pre-encoded intra-beat macroblock of the intra-beat frame and a corresponding intra-beat macroblock of the intra-beat reference frame;

responsive to the intra-beat macroblock score indicating that the pre-encoded intra-beat macroblock of the intra-beat frame and the corresponding intra-beat macroblock of the intra-beat reference frame are similar, selecting the intra-beat macroblock for processing using the intra-beat macroblock of the intra-beat reference frame;

responsive to the intra-beat macroblock score indicating that the pre-encoded intra-beat macroblock of the intra-beat frame and the corresponding intra-beat macroblock of the intra-beat reference frame are different, selecting the intra-beat macroblock for processing without using the intra-beat macroblock of the intra-beat reference frame; and processing the selected intra-beat macroblock.

8. The method of claim 7, wherein pre-encoding the intra-beat macroblock of an intra-beat frame using an intra-beat reference MB comprises:

predicting the intra-beat macroblock using the intra-beat reference macroblock;

transforming prediction residuals of the intra-beat macroblock; and quantizing transform coefficients of the intra-beat macroblock.

9. The method of claim 7, wherein selecting the intra-beat macroblock comprises:

selecting the current intra-beat macroblock for processing responsive to a total number of non-zero valued quantized residual coefficients exceeding a configurable threshold value; and selecting the corresponding intra-beat MB stored in the input frames buffer for processing responsive to the total number of non-zero valued quantized residual coefficients not exceeding the configurable threshold value.

10. The method of claim 7, wherein processing the selected macroblock comprises:

responsive to the selected macroblock being the current intra-beat macroblock, entropy encoding quantized transform coefficients of the current intra-beat macroblock;

reconstructing the current intra-beat MB, and storing the reconstructed current intra-beat MB in the reconstructed frames buffer; and responsive to the selected macroblock being the corresponding intra-beat macroblock, intra predicting the corresponding intra-beat macroblock;

transforming prediction residuals of the corresponding intra-beat macroblock;

quantizing transform coefficients of the corresponding intra-beat macroblock;

entropy encoding the quantized transform coefficients; and reconstructing the corresponding intra-beat macroblock, and storing the reconstructed corresponding intra-beat macroblock in the reconstructed frames buffer.

11. The method of claim 7, wherein an intra-beat frame of the current group of pictures being processed is an intra frame of the current group of pictures, where the current group of pictures is not the first group of pictures of the sequence of group of pictures, and each macroblock of an intra-beat frame is an intra-beat macroblock.

12. The method of claim 7, wherein an intra-beat reference macroblock is a best matching macroblock selected from a plurality of macroblocks of the intra-beat reference frame associated with the intra-beat frame, wherein the intra-beat reference frame is a reconstructed last displayed predictive frame of the immediately previous group of pictures.

13. The method of claim 12, wherein the best matching macroblock is selected by motion-compensated prediction.

14. A computer implemented method for reducing intra frame beating effect at frame level within a video processing system, comprising:

storing a sequence of groups of pictures in an input video frame buffer;

pre-encoding intra-beat frame of current group of pictures being processed using an intra-beat reference frame associated with the intra-beat frame, the intra-beat frame of the current group of pictures being a first intra frame of the current group of pictures and the current group of pictures separate from a first group of pictures of the sequence of groups of pictures, and the intra-beat reference frame being a reference frame of an immediate previous group of pictures, and the reference frame being closest to the intra beat frame in a display order of the groups of pictures;

calculating an intra-beat frame score of the pre-encoded intra-beat frame by comparing a total number of non-zero valued quantized residual coefficients of the intra-beat frame with a configurable threshold value, the intra-beat frame score representing closeness in content between the pre-encoded intra-beat frame and the intra-beat reference frame;

responsive to the intra-beat frame score indicating that the pre-encoded intra-beat frame and the intra-beat reference frame are similar, selecting the intra-beat frame to be re-encoded using the intra-beat reference frame; and responsive to the intra-beat frame score indicating that the pre-encoded intra-beat frame and the intra-beat reference frame are different, selecting the intra-beat frame to be re-encoded without using the intra-beat reference frame.

15. A computer implemented method for reducing intra frame beating effect at macroblock level in a video processing system, comprising:

pre-encoding each intra-beat macroblock of an intra-beat frame using an associated intra-beat reference macroblock of an intra-beat reference frame, the intra-beat frame of current group of pictures being a first intra frame of the current group of pictures and the current group of pictures separate from a first group of pictures of the sequence of groups of pictures, and the intra-beat reference frame being a reference frame of an immediate previous group of pictures, and the reference frame being closest to the intra beat frame in a display order of the groups of pictures;

calculating an intra-beat macroblock score of the pre-encoded intra-beat macroblock by comparing a total number of non-zero valued quantized residual coefficients of the intra-beat macroblock with a configurable threshold value, the intra-beat macroblock score representing closeness in content between the pre-encoded intra-beat macroblock of the intra-beat frame and a corresponding intra-beat macroblock of the intra-beat reference frame;

responsive to the intra-beat macroblock score indicating that the pre-encoded intra-beat macroblock of the intra-beat frame and the corresponding intra-beat macroblock of the intra-beat reference frame are similar, selecting the intra-beat macroblock for processing using the intra-beat macroblock of the intra-beat reference frame; and responsive to the intra-beat macroblock score indicating that the pre-encoded intra-beat macroblock of the intra-beat frame and the corresponding intra-beat macroblock of the intra-beat reference frame are different, selecting the intra-beat macroblock for processing without using the corresponding intra-beat macroblock of the intra-beat reference frame.

16. A system for reducing intra frame beating effect within a video processing system, comprising:

an intra frame beating reduction subsystem configured to reduce intra frame beating effect at frame level by pre-encoding one or more intra-beat frames using one or more intra-beat reference frames, an intra-beat frame of a current group of pictures being a first intra frame of the current group of pictures and the current group of pictures separate from a first group of pictures of a sequence of groups of pictures, and the intra-beat reference frame being a reference frame of an immediate previous group of pictures, and the reference frame being closest to the intra beat frame in a display order of the groups of pictures; and an intra frame beating reduction subsystem configured to reduce intra frame beating effect at frame level by:

calculating an intra-beat frame score of the pre-encoded intra-beat frame by comparing a total number of non-zero valued quantized residual coefficients of the intra-beat frame with a configurable threshold value, the intra-beat frame score representing closeness in content between the pre-encoded intra-beat frame and the intra-beat reference frame;

responsive to the intra-beat frame score indicating that the pre-encoded intra-beat frame and the intra-beat reference frame are similar, selecting the intra-beat frame to be processed using the intra-beat reference frame;

responsive to the intra-beat frame score indicating that the pre-encoded intra-beat frame and the intra-beat reference frame are different, selecting the intra-beat frame to be processed without using the intra-beat reference frame; and processing the intra-beat frame.

17. The system of claim 16, wherein the intra frame beating reduction subsystem at frame level comprises:

an input video frames buffer configured to store a sequence of groups of pictures;

a pre-encoding unit configured to pre-encode intra-beat frame of current group of pictures using an intra-beat reference frame associated with the intra-beat frame.

18. The system of claim 17, wherein the pre-encoding unit configured to pre-encode the intra-beat frame using an intra-beat reference frame, comprises:

a prediction module configured to predict the intra-beat frame using the intra-beat reference frame stored in a reconstructed frames buffer;

a transform module configured to transform prediction residuals of the intra-beat frame;

a quantization module configured to quantize transform coefficients of the intra-beat frame; and a reconstruction unit configured to reconstruct the intra-beat frame and store reconstructed intra-beat frame in a reconstructed frames buffer.

19. The system of claim 17, further comprising an intra-beat selection module configured to:

select the reconstructed intra-beat frame responsive to a total number of non-zero valued quantized residual coefficients exceeding a configurable threshold value; and select the intra-beat frame stored in the input frames buffer responsive to the total number of non-zero valued quantized residual coefficients not exceeding the configurable threshold value.

20. The system of claim 17, further comprising an intra-beat frame re-encoding module, configured to:

intra predict the selected intra-beat frame;

transform prediction residuals of the selected intra-beat frame;

quantize transform coefficients of the selected intra-beat frame;

entropy encode the quantized transform coefficients; and reconstruct the selected intra-beat frame, and store the reconstructed selected intra-beat frame in the reconstructed frames buffer.

21. The system of claim 17, wherein the intra beat frame beating reduction subsystem at macroblock level comprises:

an input video frames buffer configured to store a sequence of groups of pictures;

a macroblock pre-encoding unit configured to pre-encode each intra-beat macroblock of an intra-beat frame using an intra-beat reference macroblock associated with the intra-beat macroblock;

an intra-beat macroblock evaluation unit configured to calculate an intra-beat macroblock score of the intra-beat macroblock; and an intra-beat macroblock selection unit configured to select an intra-beat macroblock for processing responsive to the intra-beat macroblock score.

22. The system of claim 21, wherein the macroblock pre-encoding unit is configured to:

motion-compensated predict the intra-beat macroblock using the intra-beat reference macroblock;

transform prediction residuals of the intra-beat macroblock; and quantize transform coefficients of the intra-beat macroblock.

23. The system of claim 21, wherein the intra-beat macroblock selection unit is configured to:

select the current intra-beat macroblock for processing responsive to a total number of non-zero valued quantized residual coefficients exceeding a configurable threshold value; and select the corresponding intra-beat macroblock stored in the input frames buffer for processing responsive to the total number of non-zero valued quantized residual coefficients not exceeding the configurable threshold value.

24. The system of claim 21, further comprises a processing unit, configured to:

responsive to the selected macroblock being the current intra-beat macroblock,
entropy encode the quantized transform coefficients of the current intra-beat macroblock;

reconstruct the current intra-beat macroblock, and store the reconstructed current intra-beat macroblock in the reconstructed frames buffer; and responsive to the selected macroblock being the corresponding intra-beat macroblock, intra predict the corresponding intra-beat macroblock;

transform prediction residuals of the corresponding intra-beat macroblock;

quantize transform coefficients of the corresponding intra-beat macroblock;

entropy encode quantized transform coefficients; and reconstruct the corresponding intra-beat macroblock, and store the reconstructed corresponding intra-beat macroblock in the reconstructed frames buffer.

25. The system of claim 16, wherein an intra-beat frame of the current group of pictures being processed is an intra frame of the current group of pictures, which is not is not the first group of pictures of the sequence of groups of pictures.

26. The system of claim 16, wherein an intra-beat reference frame associated with an intra-beat frame is a reconstructed last displayed predictive frame of the immediately previous group of pictures.

27. A non-transitory computer readable storage medium storing computer programs instructions, for reducing intra frame beating effect in a video processing system, the computer program instructions comprising instructions, the instructions when executed by a processor cause the processor to:

reduce intra frame beating effect at frame level by processing one or more intra-beat frames using one or more intra-beat reference frames, an intra-beat frame of a current group of pictures being a first intra frame of the current group of pictures and current group of pictures separate from a first group of pictures of a sequence of groups of pictures, and the intra-beat reference frame being a reference frame of an immediate previous group of pictures, and the reference frame being closest to the intra beat frame in a display order of the groups of pictures; and reduce intra frame beating effect at frame level by:

calculating an intra-beat frame score of the processed intra-beat frame by comparing a total number of non-zero valued quantized residual coefficients of the intra-beat frame with a configurable threshold value, the intra-beat frame score representing closeness in content between the processed intra-beat frame and the intra-beat reference frame;

responsive to the intra-beat frame score indicating that the processed intra-beat frame and the intra-beat reference frame are similar, selecting the intra-beat frame to be processed using the intra beat reference frame;

responsive to the intra-beat frame score indicating that the processed intra-beat frame and the intra-beat reference frame are different, selecting the intra-beat frame to be processed without using the intra-beat reference frame; and processing the intra-beat.

28. The computer readable storage medium of claim 27 for reducing intra frame beating effect at frame level, the computer readable medium containing instructions for:

storing a sequence of groups of pictures in an input video frame buffer; and pre-encoding intra-beat frame of current group of pictures using an intra beat reference frame associated with the intra-beat frame.

29. The computer readable storage medium of claim 27 for reducing intra frame beating effect at macroblock level, the computer readable medium containing instructions for:

pre-encoding each intra-beat macroblock of an intra-beat frame using an intra-beat reference macroblock associated with the intra-beat macroblock;

calculating an intra-beat macroblock score of the intra-beat macroblock; and responsive to the intra-beat macroblock score, selecting an intra-beat macroblock for processing.

* * * * *